(12) United States Patent
Slicker

(10) Patent No.: US 6,546,328 B1
(45) Date of Patent: Apr. 8, 2003

(54) KNOCK AND MISFIRE DETECTION SYSTEM

(75) Inventor: James M. Slicker, West Bloomfield, MI (US)

(73) Assignee: Eaton Corporation, Cleveland, OH (US)

( * ) Notice: Subject to any disclaimer, the term of this patent is extended or adjusted under 35 U.S.C. 154(b) by 183 days.

(21) Appl. No.: 09/753,438

(22) Filed: Jan. 3, 2001

(51) Int. Cl.[7] .................... G01L 23/22; G01M 15/00; F02P 5/00
(52) U.S. Cl. .................... 701/111; 701/114; 701/110; 73/35.09; 73/117.3; 123/406.38
(58) Field of Search .................. 701/115, 111, 701/110, 114; 73/116, 117.3, 35.09; 123/406.12, 406.13, 406.21, 406.24, 406.38, 406.6, 406.65, 406.16

(56) References Cited

U.S. PATENT DOCUMENTS

| | | | |
|---|---|---|---|
| 4,255,965 A | * 3/1981 | Schulz et al. | 73/35.11 |
| 4,424,706 A | * 1/1984 | Oh | 123/406.38 |
| 4,716,874 A | * 1/1988 | Hilliard et al. | 123/406.34 |
| 5,101,790 A | 4/1992 | Takasu et al. | |
| 5,109,820 A | * 5/1992 | Iwata et al. | 123/406.37 |
| 5,188,080 A | 2/1993 | Sakakibara et al. | |
| 5,190,011 A | 3/1993 | Hashimoto et al. | |
| 5,355,853 A | 10/1994 | Yamada et al. | |
| 5,387,253 A | * 2/1995 | Remboski et al. | 73/117.3 |
| 5,394,330 A | * 2/1995 | Horner | 701/111 |
| 5,400,644 A | * 3/1995 | Remboski et al. | 701/111 |
| 5,460,031 A | 10/1995 | Fujishita et al. | |
| 5,608,633 A | 3/1997 | Okada et al. | |
| 5,753,804 A | * 5/1998 | La Palm et al. | 73/116 |
| 5,824,890 A | * 10/1998 | La Palm et al. | 73/117.3 |
| 5,862,507 A | * 1/1999 | Wu et al. | 701/111 |
| 5,932,801 A | 8/1999 | Akishita et al. | 73/116 |
| 6,006,155 A | * 12/1999 | Wu et al. | 701/111 |

FOREIGN PATENT DOCUMENTS

| | | |
|---|---|---|
| EP | 0 982 578 | 3/2000 |
| JP | 05 248937 | 9/1993 |

OTHER PUBLICATIONS

*Wavelet Analysis of Non–Intrusive Pressure Transducer Traces*, by C. Mobley, dated Mar. 6–9, 2000.
*Using Multi–Rate Filter Banks to Detect Internal Combustion Engine Knock*, by Klaas Burgdorf and Anders Karlstrom, dated May 5–8, 1997.
*Wavelet Transform Analysis of Measurements of Engine Combustion Noise*, by Grover Zurita Villarroel and Anders Agren, copyright 1997 Society of Automotive Engineers, Inc.
*Engine Knock Detection: Products, Tools, and Emerging Research*, by John Wagner, John Keane, Robert Koseluk, and William Whitlock, copyright 1998 Society of Automotive Engineers, Inc.
Derwent English Abstract for JP 05 248937.
European Search Report, 2 pages.

* cited by examiner

*Primary Examiner*—Hieu T. Vo
(74) *Attorney, Agent, or Firm*—Rader, Fishman & Grauer PLLC

(57) ABSTRACT

The invention relates to a system for detection of combustion anomalies in an internal combustion engine, and includes a crank angle indicator, a vibration sensor, and a signal processor, wherein the signal processor receives signals from the indicator and the sensor, performs a wavelet transform analysis of the signals from the sensor to develop a vibration frequency signature on a time scale, compares the vibration frequency signature to a predetermined value to determine the existence of anomalies in the combustion process, and compares the time scale of the vibration frequency signature to the signal from the indicator to determine which of a plurality of cylinders of the internal combustion engine is exhibiting the combustion anomaly.

25 Claims, 5 Drawing Sheets

KNOCK AND MISFIRE DETECTION SYSTEM

BACKGROUND OF THE INVENTION

1. Field of the Invention

The invention relates to a system for detecting knock or misfire in a cylinder or cylinders of an internal combustion engine. In one of its aspects, the invention relates to a knock or misfire detection system using a single acceleration sensor associated with the engine block. In another of its aspects, the invention relates to a knock or misfire detection system applying digital signal processing technology and discrete wavelet transform algorithms to determine which cylinder or cylinders are exhibiting knock or misfire characteristics.

2. Description of the Related Art

Electronic engine control systems can best adapt to the operating conditions existent in an internal combustion engine when the electronic control system is supplied with current and valid information regarding the operating conditions within the engine. Primary considerations for the operating conditions within the engine include the fuel-air mixture and the timing of an electric spark provided to ignite the compressed fuel-air mixture within each of the cylinders of an internal combustion engine. A mistimed spark or inadequate spark can contribute to knocking in the engine or misfire, respectively. At issue are the methods and means by which the electronic control system is provided with valid information not only for the engine as a whole but for each cylinder of the engine which can independently experience knock or misfire.

Methods of detecting conditions within the engine have been proposed that include optical sensors, pressure sensors, vibration sensors and sensors of electrical characteristics for the ignition system.

Vibration sensors can provide some of the least intrusive methods of gathering data about engine combustion but are subject to providing misleading data due to vibrations generated by the engine and not related to knock or misfire and potentially masking the combustion event in question. Combustion noise is regarded as one of the major factors contributing to engine vibrations. Combustion noise radiates through the engine structure as a direct result of the rapidly changing pressures in the combustion chambers. This combustion noise can include noise generated by piston slap, timing gear impacts, bearing impacts, the fuel system and the valve system. The key to providing useful information to the electronic control system comes in the ability to sort useful vibrations out of the background.

A composite signal from a vibration sensor can be parsed by any number of well-known methods, including a fast Fourier transform. The fast Fourier transform, however, does not give sufficiently differentiated frequency distribution as a function of time to be useful in the electronic engine control system. Wavelet transform analysis, in contrast, can provide frequency distribution information associated with a time scale for use by the electronic control system for association with a given cylinder of the internal combustion engine and with a given position of that cylinder in the internal combustion cycle.

It, therefore, would be advantageous to provide an electronic engine control system incorporating a digital signal processor using wavelet transform analysis to interpret engine vibrations for association with a given type of combustion event in a given cylinder.

SUMMARY OF THE INVENTION

The invention relates to a system for detection of combustion anomalies in an internal combustion engine, and includes a crank angle indicator, a vibration sensor, and a digital signal processor. The digital signal processor receives signals from the indicator and the sensor and performs a wavelet transform analysis of the signals from the sensor to develop a vibration frequency signature on a time scale. The digital signal processor then compares the vibration frequency signature to a predetermined value to determine the existence of anomalies in the combustion process, and compares the time scale of the vibration frequency signature to the signal from the indicator to determine which of a plurality of cylinders of the internal combustion engine is exhibiting the combustion anomaly.

DESCRIPTION OF THE PREFERRED EMBODIMENT

A knock/misfire detection system according to the invention includes a sensing module comprising one wide-band (linear) vibration sensor (not shown) attached at some central location on the engine block. The vibration sensor can be in the form of an accelerometer, such as a piezoelectric accelerometer. The vibration sensor is preferably situated proximate the centroid of the engine block. The system further reads or receives pulses from an existing engine crank angle sensor. The system then uses the information received from the various sensors in an analysis including the following steps:

A. Read vibration data S (see FIG. 1). The sampling rate for our test was 100 kHz, to account for background noise. However, lower sampling rates may be possible if an anti-aliasing filter is used. In the preferred embodiment, vibrations outside of a window from about 3 kHz to 12 kHz would be discarded.

Figure 1:
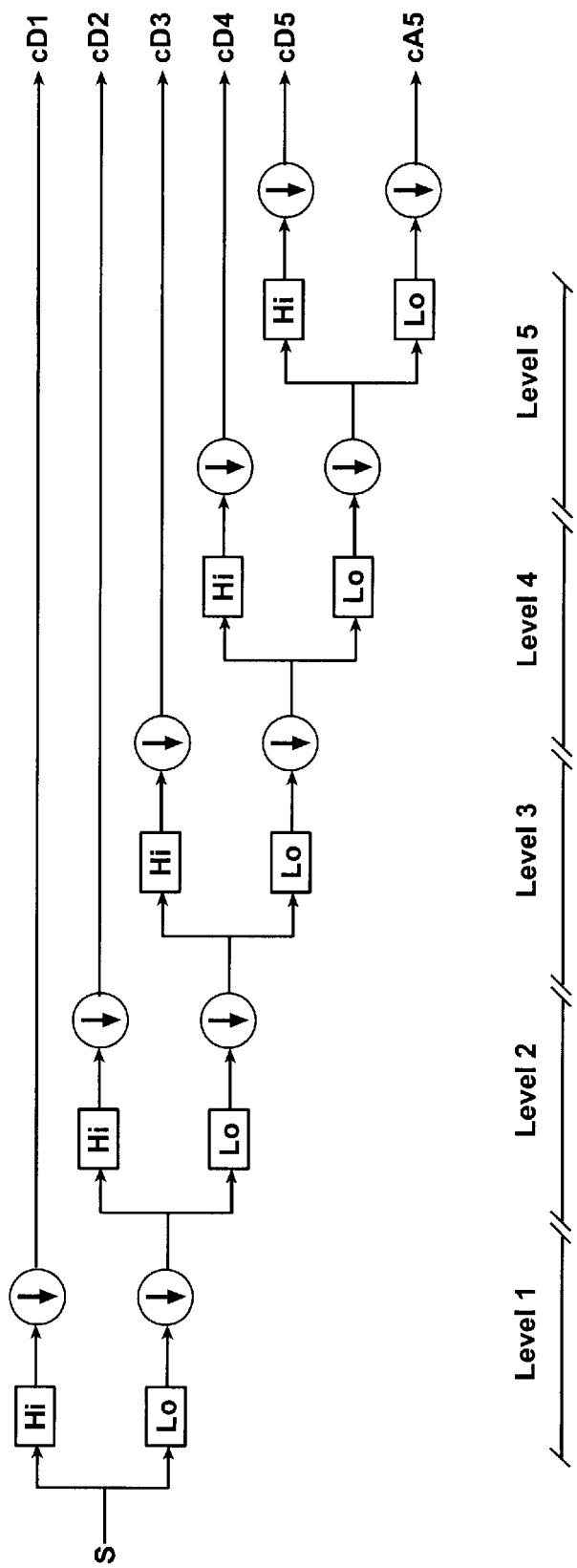
FIG. 1 is a schematic of a wavelet decomposition tree according to the invention.

B. Calculate the vibration data wavelet coefficients. Wavelet coefficients, as is known to one skilled in the art, can be calculated by passing the data through a set of "analysis" filter banks as shown in FIG. 1. These filter banks consist of sets of lowpass (designated Lo) and highpass (designated Hi) Finite Impulse Response (FIR) filters known to anyone skilled in the art. Referring to FIG. 1, the circles containing downward pointing arrows represent the process of "downsampling", in which every other data point is removed from the data stream. Thus, for a five-level wavelet transform, as shown in the FIG. 1, the wavelet coefficients for five corresponding "scales" are shown as cD1, cD2, cD3, cD4, and cD5, with cA5 representing the resultant low band average output remaining after the five-level decomposition. A five-level wavelet decomposition was used in this invention.

An example of a fifth order Finite Impulse Response (FIR) filter is given below.

$$y_k = h_1 x_k + h_2 x_{k-1} + h_3 x_{k-2} + h_4 x_{k-3} + h_5 x_{k-4},$$

where $x_i$ values refer to the input data at time i, the $h_1$ values refer to the filter coefficients, and $y_k$ is the filter output at time k.

The values for filter coefficients, hl, are selected to produce the family of wavelet being represented. For example, the so called "db5" wavelet, named for I. Daubechies, is constructed with a set of unique filter coefficients, available to anyone skilled in the art. The order of the filter (five) is not necessarily related to the five-level wavelet decomposition, but to the wavelet type. For example the "db5" wavelet filter requires a fifth order FIR filter. The five-level decomposition can be implemented with any order of filter.

C. Window the data. "Windowing" consists of looking only at data occurring about some event. For the present invention the event is during the time covering the peak cylinder pressure or the firing of the spark plug. This is easily accomplished, since the value for crank angle is continuously available via the crank angle sensor.

D. Apply thresholding to the wavelet coefficients within the windowed data. Thresholding consists of comparing the wavelet coefficients with a predetermined "threshold" value. If the coefficient exceeds the threshold, keep the coefficient, else discard it. A knocking engine will exhibit more wavelet coefficients above the threshold than a normal engine, thus providing a basis for detecting knock. Conversely, a misfiring engine will have very few wavelet coefficients above the threshold. The criteria for setting the thresholds may vary based upon the scale of the coefficients. In addition the threshold for knock may be different (usually higher) than the threshold for misfire.

E. Calculate a "knock/misfire index" for the thresholded wavelet coefficients. The index represents the sum of the absolute values of the wavelet coefficients that exceeded thresholds. A sample calculation is as follows:

$$I_k = \sum_{j=1}^{5} \sum_{i=1}^{N_j} cD_j(i) \qquad [0024]$$

where $I_k$ is the index, $cD_j(i)$ is the wavelet coefficient at time i for level j. $N_j$ represents the number of wavelet coefficients for each level. N varies by a factor of two for each level due to downsampling as shown in FIG. 1.

F. Classify the combustion as either "knock", "misfire", or "normal" based upon the index being "high", "low" or "midrange" compared to a standard. The standard can be established as upper and lower thresholds, between which "normal" combustion is occurring, above which "knock" is occurring, and below which "misfire" is occurring. Alternatively, the standard can be one of a number of recorded coefficient patterns indicative of one of the conditions in question.

Figure 2:
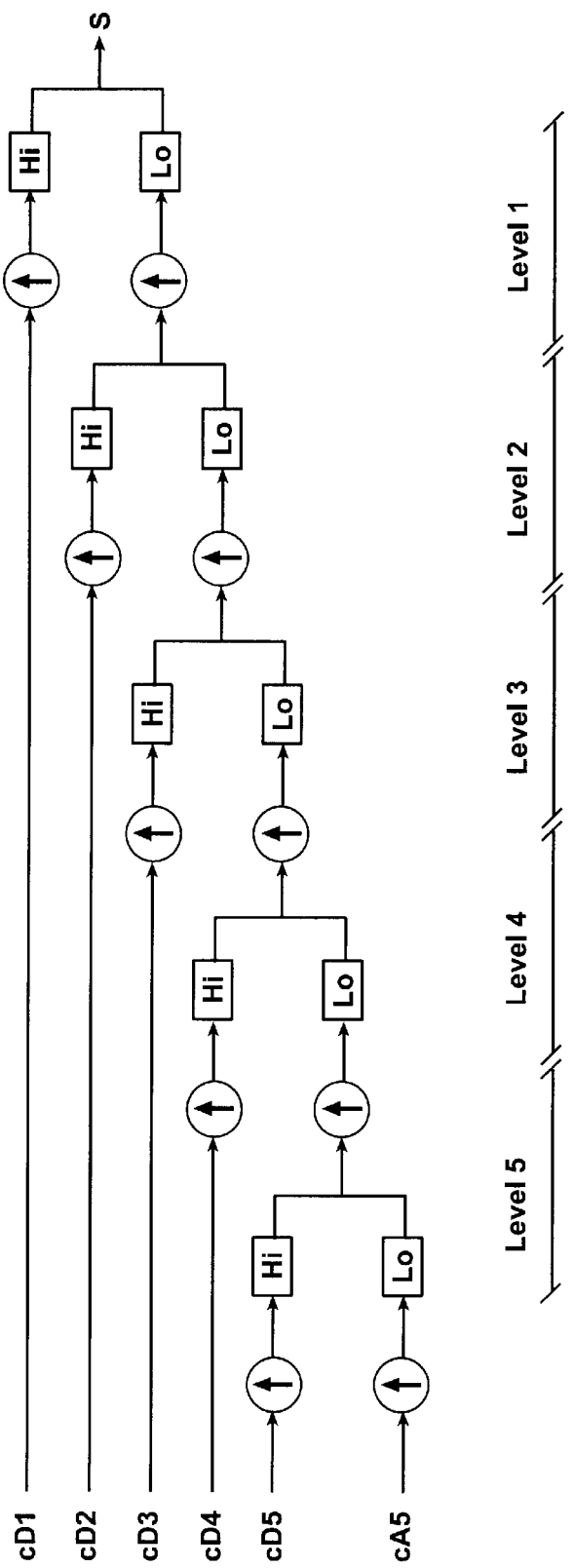
FIG. 2 is a schematic of a wavelet decomposition tree according to the invention.
Figure 3:
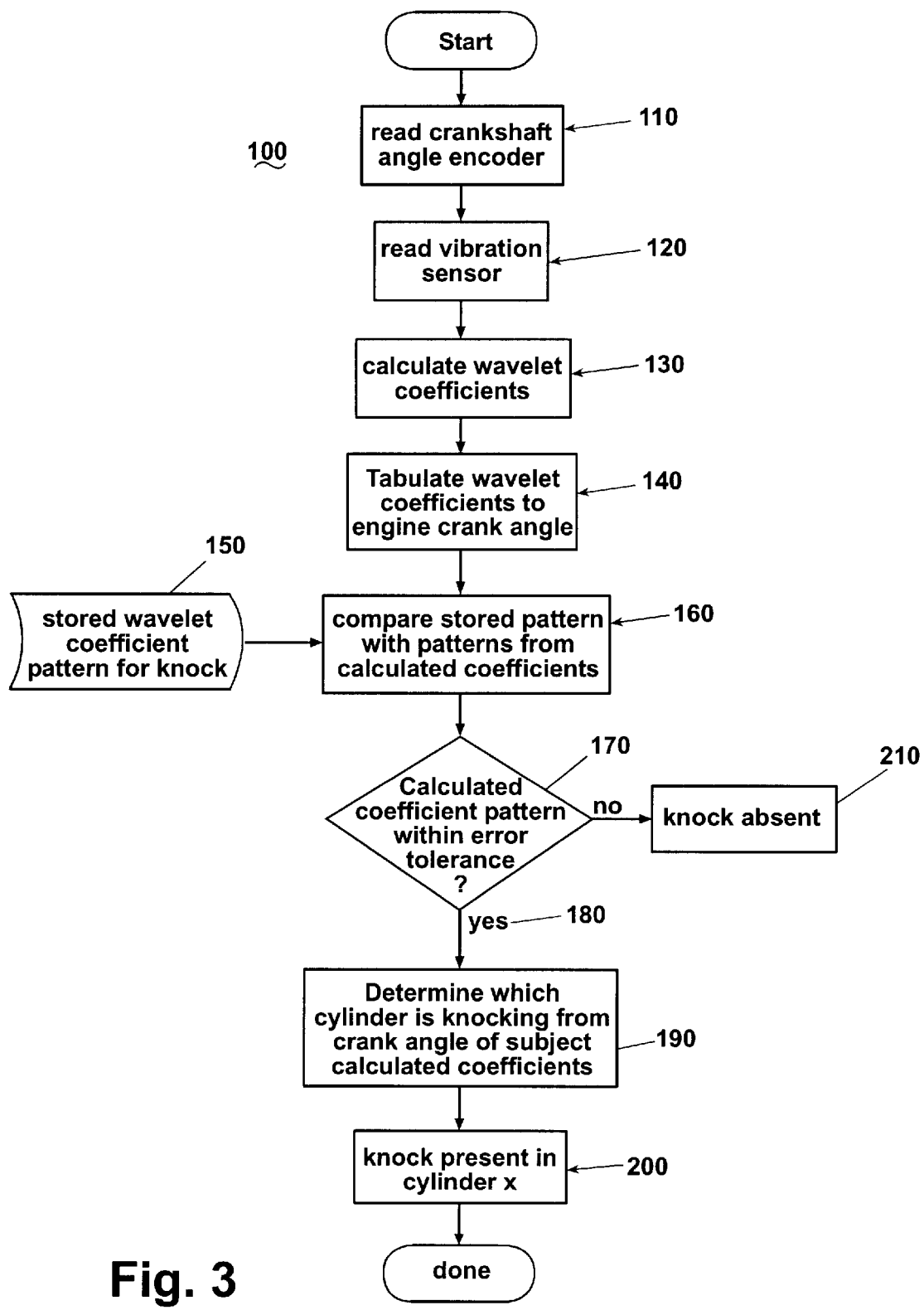
FIG. 3 is a flow chart depicting knock determination according to the invention.

This procedure was tested upon knock/misfire/normal data with the following addition to the procedure, which was added only for the purposes of determining acceptable correlation of the base procedure to a more refined processing of the input signal. The following extra steps constitute a viable knock/misfire detection procedure but entail additional computations. It was found as a result that the base method provides acceptable results in the detection of the respective combustion conditions.

a. Skip step C.

b. Between steps D and E insert the process to calculate the inverse discrete wavelet transform with the set of "synthesis" filter banks as shown in FIG. 2. This step produces the filtered or "denoised" signal.

d. Apply the windowing of step C above to the denoised vibration signal.

e. Calculate the knock/misfire index based upon the denoised windowed vibration signal.

f. Classify the combustion as in step F above,

Referring now to FIG. 3, a knock/misfire detection system 100 according to the invention is described by way of a flow chart encompassing one window of time or cycle within the combustion process. In the first step in the cycle, the system 100 according to the invention reads a crankshaft angle encoder 110 for stating a basis in time for that phase of the engine combustion cycle. The system then receives a signal from a vibration sensor 120 according to the invention in the form of raw vibration information detected by the vibration sensor. The raw vibration data is then processed as described above to calculate the wavelet coefficients 130 of the raw data provided by the vibration sensor 120. The system according to the invention then tabulates 140 the wavelet coefficients to the engine crank angle to align the wavelet coefficients on a timeline scale within the phase of the combustion cycle. A stored wavelet coefficient pattern for knock 150 is then compared 160 to the patterns of the calculated wavelet coefficients. If the calculated coefficient pattern is within an error tolerance 170 of the stored wavelet coefficient pattern for knock, then a knock 180 is determined to exist. The cylinder displaying the knock characteristics is determined 190 with the result that the engine control system is informed that a knock is present in the indicated cylinder. If the calculated coefficient pattern is not within an error tolerance 170 of the stored wavelet coefficient pattern for knock 150, then knock is absent 210. In the preferred embodiment, the stored wavelet coefficient 150 is indicative of knock, but other combustion conditions, such as the normal combustion condition or the misfire combustion condition, can be represented by the stored wavelet coefficient 150 and compared 160 to the patterns of the calculated wavelet coefficients.

Figure 4:
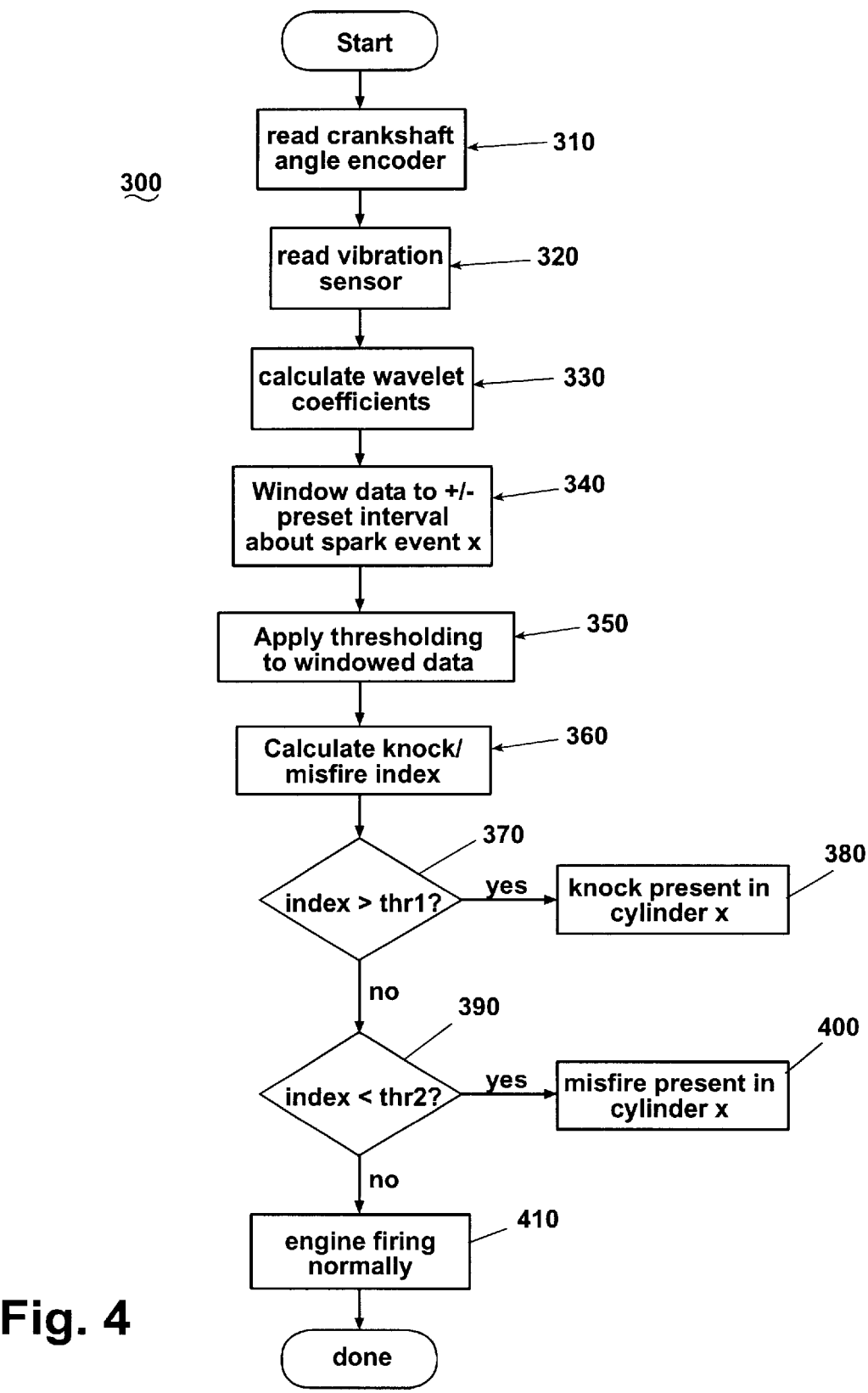
FIG. 4 is a further embodiment of a knock/misfire detection system according to the invention using thresholding data.

Referring to FIG. 4, a further embodiment of the invention is depicted wherein a knock/misfire detection system 300 includes an element for reading the crankshaft angle encoder 310, and reading the vibration sensor 320 for incorporation of raw data detected by the vibration sensor. The knock/misfire detection system 300 according to the invention then calculates the wavelet coefficients 330 from the raw data provided by the vibration sensor 320. The wavelet coefficients data is then windowed 340 about each spark event (timed in reference to crankshaft angle encoder 310, the window extending a preset interval about each spark event. A threshold is then applied to the windowed data 350 to calculate the knock/misfire index 360. The knock/misfire index is then compared to predetermined threshold values. If the knock/misfire index is greater than a first threshold value (thr1) 370 then a knock is indicated as being present in the cylinder associated with the indicated spark event. If the index value is not greater than the first threshold value (thr1), the index is then compared to a second, lower threshold (thr2) 390. If the index is less than the second threshold (thr2), then a misfire 400 is indicated in the cylinder in question. If the index is not less than the second threshold (thr2) and therefore lies in between thr1 and thr2, the resultant indication is that the engine is firing normally 410.

Figure 5:
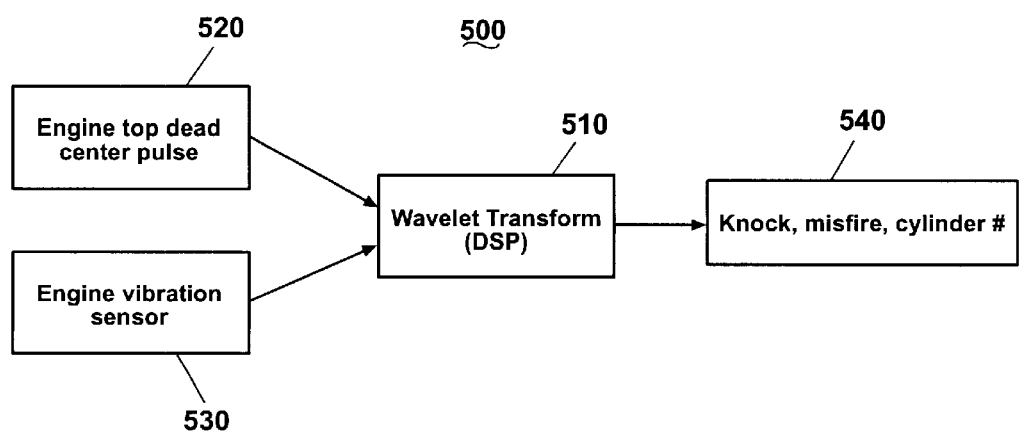
FIG. 5 is a schematic of the knock/misfire detection system according to the invention.

Referring to FIG. 5, the knock/misfire detection system according to the invention is schematically depicted as a wavelet transform 510 receiving input in the form of an engine top dead center pulse 520 (such as generated by a crank angle encoder) and the data from an engine vibration sensor 530. The resultant information generated by the wavelet transform 540 is an indication as to whether the system or phase of the internal combustion cycle is exhibiting knock or misfire characteristics and the cylinder or cylinders exhibiting those characteristics.

While the invention has been specifically described in connection with certain specific embodiments thereof, it is to be understood that this is by way of illustration and not of limitation, and the scope of the appended claims should be construed as broadly as the prior art will permit.

What is claimed is:

1. A system for detection of combustion anomalies in an internal combustion engine, comprising:

a crank angle indicator;

an engine sensor; and a signal processor;

wherein the signal processor receives signals from the indicator and the sensor, performs a wavelet transform on the signals from the sensor to develop a vibration frequency signature on a time scale, compares the vibration frequency signature to a predetermined value to determine the existence of a type of anomaly in the combustion process, and compares the time scale of the vibration frequency signature to the signal from the indicator to determine which of a plurality of cylinders of the internal combustion engine are exhibiting the anomaly.

2. The system of claim 1, wherein the sensor is a vibration sensor.

3. The system of claim 2, wherein the vibration sensor is an accelerometer.

4. The system of claim 1, wherein the wavelet transform includes a discrete wavelet transform decomposition step.

5. The system of claim 4, wherein the wavelet transform further includes a discrete wavelet synthesis step.

6. The system of claim 1, wherein the anomaly is a knock condition.

7. The system of claim 1, wherein the anomaly is a misfire condition.

8. The system of claim 1, wherein the predetermined value is a threshold value indicative of a knock condition.

9. The system of claim 8, wherein the signal processor further compares the vibration frequency signature to a second predetermined value to determine the existence of a second type of anomaly.

10. The system of claim 1, wherein the predetermined value is a threshold value indicative of a misfire condition.

11. The system of claim 10, wherein the signal processor further compares the vibration frequency signature to a second predetermined value to determine the existence of a second type of anomaly.

12. The system of claim 1, wherein the predetermined value is a wavelet coefficient pattern.

13. The system of claim 12, wherein the wavelet coefficient pattern is correlated to a knock condition.

14. The system of claim 12, wherein the wavelet coefficient pattern is correlated to a normal combustion condition.

15. A system for detecting knock or misfire in any one of a number of cylinders in an internal combustion engine, and for identifying which cylinder is exhibiting the knock or misfire, the system comprising:

a sensor for detecting a condition resulting from combustion and generating a signal related to the condition;

a crank angle encoder; and a digital signal processor for receiving the signals from the sensor and the encoder;

wherein the digital signal processor performs a wavelet transform on the signal received from the sensor, and filters the signal to determine if the signal varies from predetermined parameters that indicate the existence of a knock or misfire condition, and further correlates the signal with the crank angle encoder signal to associate the knock or misfire condition with each of the number of cylinders of the engine exhibiting the knock or misfire condition.

16. The system of claim 15, wherein the wavelet transform produces a wavelet coefficient value.

17. The system of claim 16, wherein the parameters include an upper threshold value correlating to a knock condition.

18. The system of claim 17, wherein the parameters include a lower threshold value correlating to a misfire condition.

19. The system of claim 18, wherein the wavelet transform produces multiple wavelet coefficient values.

20. The system of claim 19, wherein the wavelet coefficient values are compared to a stored wavelet coefficient pattern for knock.

21. The system of claim 17, wherein the parameters include an upper threshold value correlating to a knock condition.

22. The system of claim 21, wherein the parameters include a lower threshold value correlating to a misfire condition.

23. The system of claim 15, wherein the parameters include a store wavelet coefficient value.

24. The system of claim 15, wherein the condition comprises vibrations in the block of the engine.

25. The system of claim 15, wherein the condition comprises exhaust pressure.

* * * * *